T. W. JOCKISCH.
PEANUT PICKER.
APPLICATION FILED FEB. 12, 1916.
1,196,458.
Patented Aug. 29, 1916.
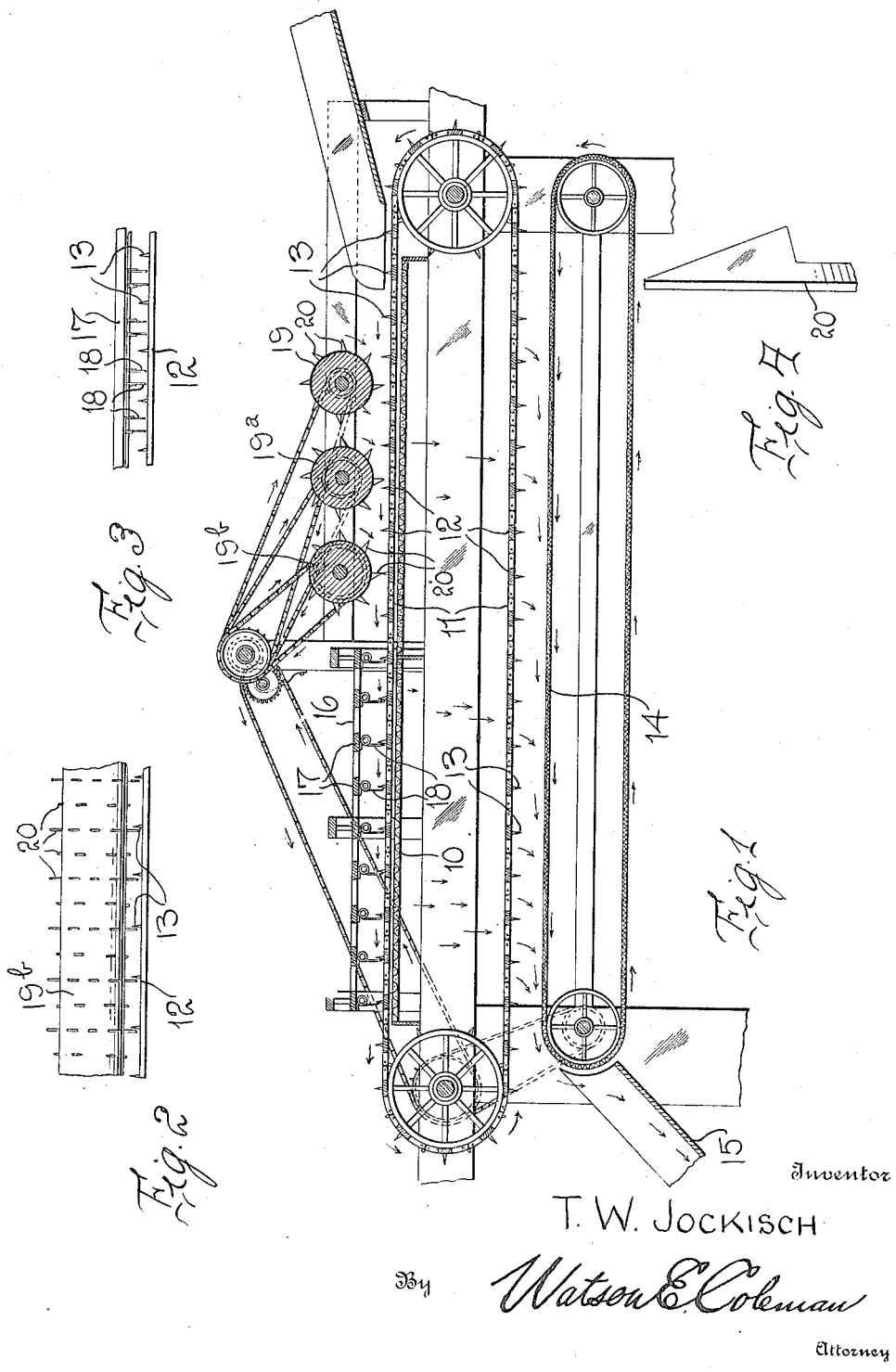
Inventor
T. W. JOCKISCH
By Watson E. Coleman
Attorney

UNITED STATES PATENT OFFICE.

THEODORE W. JOCKISCH, OF GREENSBORO, ALABAMA.

PEANUT-PICKER.

1,196,458.　　　Specification of Letters Patent.　　Patented Aug. 29, 1916.

Application filed February 12, 1916. Serial No. 77,989.

*To all whom it may concern:*

Be it known that I, THEODORE W. JOCKISCH, a citizen of the United States, residing at Greensboro, in the county of Hale and State of Alabama, have invented certain new and useful Improvements in Peanut-Pickers, of which the following is a specification, reference being had to the accompanying drawings.

This invention relates to peanut pickers and particularly to peanut pickers of that class wherein the peanut vines are operated upon by an endless chain moving over a screen, the vines being carried forward by the endless chain and eventually passing under transversely extending bars having resilient fingers for detaching the peanuts from the vines. In feeding vines in machines of this character, it is a difficult matter to distribute the vines evenly. If large bunches are placed upon the vine carrier, the bunches will pass through the greatest portion of the machine before they become pulled apart so that the spring fingers and the wire mesh can do their proper work.

A general object of my invention is to provide means for more evenly distributing the vines before they reach the picker fingers, thereby giving the resilient picker fingers a better chance for cleaning the vines of peanuts, and a further object is to provide means as above described which will also act to detach a large percentage of the nuts before the picking fingers are reached.

Still another object is to provide mechanism of this character which will relieve the machines of the severe strain caused by operating upon too large bundles.

Still another object is to provide means to accomplish the ends above named which means may be readily attachable to machines of the character above stated.

My invention is illustrated in the accompanying drawings, wherein—

Figure 1 is a longitudinal sectional view of a peanut picker of ordinary construction with the distributing rollers thereon; Fig. 2 is an elevation of one of the distributing rollers and the adjacent portion of the endless element; and Fig. 3 is a fragmentary elevation of the picking frame 17 and the adjacent portion of the endless element. Fig. 4 is a detail perspective view showing one of the spikes of the retarding rollers detached.

Referring to these drawings, it will be seen that I have illustrated an ordinary type of machine wherein there is used a wire mesh screen 10 together with endless elements 11 having transverse bars 12 attached thereto, these endless elements and the bars together constituting a wire carrier and operating over the face of the screen 10. The transverse bars 12 are formed with upwardly projecting spikes 13 to engage the vines and pull the vines through the machine. Below the lower flight of the endless element composed of the members 11 and 12 and of course below the screen 10 is a carrier 14 upon which the detached peanuts are received after passing through the screen 10 and by which they are directed into any suitable receptacle 15. Disposed at the rear end of the machine and above the vine carrier is a frame 16 having the same width as the carrier and having transverse bars 17 provided with downwardly projecting resilient picking fingers 18, these picking fingers being formed of small pieces of resilient wire coiled upon themselves and these picking fingers being so designed as to disengage the peanuts from the vines. As before remarked, all of these elements are old and well known and it is the main object of my invention to provide means for more perfectly distributing the vines as they enter the machine and preventing any bunching of the vines. To this end I mount above the path of travel of the vine carrier one or more rolls 19, these rolls being positively rotated but all of the rolls being rotated at a slower speed than the speed of travel of the carrier 11 and 12. If there are a plurality of these rolls, it is preferable that they rotate at different speeds. These rolls are about six inches in diameter and are formed with spikes 20 projecting outward from the roll about one and one-half inches. Each spike has a straight edge face and an inclined edge face, the inclined edge face being disposed in the direction of movement of the roll. I have illustrated three of these cylinders or rolls, one designated 19, the other 19ª, and the other 19ᵇ. The cylinder 19 runs at the rate of about twelve revolutions a minute, or nearly that of the screen, the cylinder 19ᵃ at about eight revolutions, and the cylinder 19ᵇ at about four revolutions a minute. It will thus be seen that there will be a small retardation of the vines when they enter the machine and that because of the difference in speed between the vine carrier and the roller 19, the vines will be torn apart or rather the bundles will be torn apart and distributed. The cylinder 19ᵃ rotates slower than the cylinder 19, and, as a consequence, there will be a greater difference in speed between the cylinder 19ᵃ and the vine carrier so that there will be a greater tendency to tear apart the vine bunches. The roll or cylinder 19ᵇ rotates at a still slower speed, a great deal less than that of the speed of movement of the vine carrier so that the vines are gradually retarded in their movement as they pass from 19 to 19ᵇ and when the vines pass the roll 19ᵇ they will be carried along with the vine carrier beneath the fingers 18.

The action of the rollers 19, 19ᵃ and 19ᵇ is not only to tear the vine bundles apart and distribute the vines evenly over the carrier but also these rollers act to detach a large portion of the peanuts from the vines so that the vines are stripped to a considerable degree before they pass beneath the picking fingers 18. The spikes on the rollers are so shaped as to hold and evenly distribute all the large vine bundles before they come into contact with the spring fingers and thus instead of clogging in front of the spring fingers the vines are evenly distributed and a large percentage of the nuts are picked. By my invention the vines are distributed evenly before reaching the spring fingers, thus giving the springs a better chance to clean the nuts from the vines, and a large percentage of the nuts are picked before the springs are reached and the machine is relieved from the strain to which it will be ordinarily subjected due to bundles of vines clogging against the spring fingers.

I do not wish to be limited to any particular means of mounting the rollers 19, 19ᵃ and 19ᵇ nor driving these rollers, as it is obvious that this is a matter of mechanical detail. Neither do I wish to be limited to any form of machine upon which this picker is mounted as it is obvious that it may be applied to machines of various forms without departing from the spirit of the invention. Nor do I wish to be limited to any specific speed for the rollers as in different machines the drag chains will run at different speeds and consequently the speed of the rollers must have a proper ratio to the speed of the drag chains.

I have illustrated a particular form of peanut picking machine provided with a feed table, but I do not wish to be limited to the particular form of machine shown. Preferably the feed table is pivoted to the frame so that it may be folded back over the rollers while the machine is being moved from place to place.

Having described my invention what I claim is:

1. In a peanut picker, the combination with a screen, a vine carrier movable over the screen, and nut detaching means coacting with the vine carrier and disposed adjacent one end of its flight, of vine retarding means mounted above the vine carrier in advance of the nut detaching means and engaging the vines on said carrier to retard their movement with the carrier.

2. In a peanut picking machine, the combination with a screen, a vine carrier moving over the screen, picking devices arranged above the vine carrier at one end thereof, of a retarding roller mounted above the vine carrier in advance of the picking devices having projecting vine engaging members, said roller rotating in the same direction as but at a slower rate of speed than the speed of movement of the vine carrier.

3. In a peanut picking mechanism of the character described, the combination with a screen, a vine carrier movable over the screen, picking devices located at one end of the vine carrier, of means for retarding the vines engaged by the carrier and distributing said vines comprising a plurality of rollers extending transversely above the path of movement of the vine carrier and in advance of the picking devices, each of said rollers having outwardly projecting spikes adapted to engage the vines, the rollers rotating in the same direction as the direction of movement of the adjacent flight of the vine carrier but at a slower rate of speed.

4. In a peanut picking mechanism of the character described, the combination with a screen, a vine carrier movable over the screen, picking devices located at one end of the vine carrier, of means for retarding the vines engaged by the carrier and distributing said vines, comprising a plurality of rollers extending transversely above the path of movement of the vine carrier and in advance of the picking devices, each of said rollers having outwardly projecting spikes adapted to engage the vines, the rollers rotating in the same direction as the direction of movement of the adjacent flight of the vine carrier but at a slower rate of speed, said rollers rotating at relatively different speeds.

5. In a peanut picking mechanism of the character described, the combination with a screen, a vine carrier movable over the screen, picking devices located at one end of the vine carrier, of means for retarding the vines engaged by the carrier and distributing said vines, comprising a plurality of rollers extending transversely above the path of movement of the vine carrier and in advance of the picking devices, each of said rollers having outwardly projecting spikes adapted to engage the vines, the rollers rotating in the same direction as the direction of movement of the adjacent flight of the vine carrier but at a slower rate of speed, the first one of said rollers rotating at a relatively high speed, the succeeding rollers rotating at progressively lower speeds, all of said rollers having a speed of movement less than that of the carrier.

In testimony whereof I hereunto affix my signature in the presence of witnesses.

THEODORE W. JOCKISCH.

Witnesses:
EDWIN S. JACK,
G. F. JOHNSON,
F. H. JOCKISCH.

Copies of this patent may be obtained for five cents each, by addressing the "Commissioner of Patents, Washington, D. C."